United States Patent [19]

Kondo

[11] Patent Number: 5,193,003
[45] Date of Patent: Mar. 9, 1993

[54] APPARATUS FOR DECODING DIGITAL VIDEO DATA WITH SMALL MEMORY REQUIREMENT

[75] Inventor: Tetsujiro Kondo, Kanagawa, Japan

[73] Assignee: Sony Corporation, Tokyo, Japan

[21] Appl. No.: 869,898

[22] Filed: Apr. 15, 1992

Related U.S. Application Data

[63] Continuation of Ser. No. 563,921, Aug. 7, 1990.

[30] Foreign Application Priority Data

Aug. 15, 1989 [JP] Japan .................. 1-210446

[51] Int. Cl.$^5$ .................................. H04N 7/12
[52] U.S. Cl. ................................... 358/136; 358/133
[58] Field of Search ...................... 358/133, 136, 138

[56] References Cited

U.S. PATENT DOCUMENTS

| | | | |
|---|---|---|---|
| 4,703,352 | 10/1987 | Kondo | 358/138 |
| 4,729,021 | 3/1988 | Kondo | 358/136 |
| 4,764,805 | 8/1988 | Rabbani et al. | 358/138 |
| 4,802,005 | 1/1989 | Kondo . | |
| 4,845,560 | 7/1989 | Kondo et al. | 358/136 |
| 4,887,156 | 12/1989 | Ohki | 358/136 |
| 4,890,161 | 12/1989 | Kondo | 358/138 |
| 4,947,249 | 8/1990 | Kondo | 358/136 |
| 4,953,023 | 8/1990 | Kondo | 358/136 |
| 5,006,931 | 4/1991 | Shirota | 358/133 |

OTHER PUBLICATIONS

Frequenz, vol. 42, No. 10, Oct. 1988, Berlin, DE, pp. 284-288: G. Schamel: "Mehrdimensionals Vorfilterung, Rreduktion der Abtastrate und Interpolation von HDTV-Signalen (Teil I)".
Proceedings of the Second International Workshop on Signal Processing of HDTV; L'Aquila, It; Feb. 29-Mar. 2, 1988; North Holland, Amsterdam, NL; L. Contin et al.: "Very Low λ2 Bitrate Coding of HDTV Signals"; pp. 303-308.

Primary Examiner—Edward L. Coles, Sr.
Assistant Examiner—Kim Yen Vu
Attorney, Agent, or Firm—Philip M. Shaw, Jr.

[57] ABSTRACT

A decoding apparatus for receiving data transmitted from transmission equipment which performs subsampling so that a sampling phase is inverted between n frames (n is an integer), converts data subjected to the subsampling into a two-dimensional block structure, generates a discriminating code indicative of detected movement and performs compressing and encoding for the two-dimensional block data. The decoding apparatus comprises a decoding circuit for decoding data and for generating the decoded data, and an adaptive interpolation circuit for interpolating non-transmission data using the actually transmitted data. The interpolation circuit interpolates the non-transmission picture elements, adaptively using transmitted data of the identical frame and an adjacent frame responsively to the discriminating code.

4 Claims, 4 Drawing Sheets

APPARATUS FOR DECODING DIGITAL VIDEO DATA WITH SMALL MEMORY REQUIREMENT

This is a continuation of co-pending application Ser. No. 07/563,921 filed on Aug. 7, 1990.

BACKGROUND OF THE INVENTION

1. Field of the Invention

This invention relates to a decoding apparatus for transmission equipment for transmitting or recording digital picture data with the data compressed through highly efficient encoding.

2. Description of the Prior Art

In one method of encoding to decrease the picture data is converted into a two-dimensional or three-dimensional block structure and compressed and encoded in every block. The two-dimensional block is formed by segmenting one field or one frame, while the three-dimensional block is formed as an assembly of two-dimensional blocks respectively belonging to plural frames which are continuous in time. Encoding of the two-dimensional block has an advantage in that the circuit size is small, while the encoding of the three-dimensional block has not only the advantage that improved efficiency can be achieved but also an advantage that a decoded still picture has high quality.

Further, encoding which combines subsampling and block encoding is known. With such encoding, highly efficient compression can be achieved. In particular, a system in which the phase of subsampling varies with every frame can attain compression without degradation of definition of a still picture by the use of interpolation over time.

The transmission side of such an encoding apparatus is equipped with a subsampling circuit, a block segmentation circuit for converting the order of input data into a three-dimensional block structure, and an encoder for block encoding, and a buffering circuit is provided so that the data generated for a predetermined period (for example, one frame period) by the encoder does not exceed the capacity of the transmission path. On the reception side, a decoder of the block encoding, a block desegmentation circuit for converting the three-dimensional block structure into the scanning order, and an interpolating circuit for interpolating non-transmission picture elements thinned out in the subsampling are provided.

In a conventional encoding system where the subsampling and the encoding of the three-dimensional block are combined, the block segmentation circuit requires a two-frame memory, and the buffering circuit needs also two-frame memory for delaying picture data. Similarly, on the reception side, a two-frame memory for block desegmentation and a two-frame memory for interpolation are needed. Consequently, an eight-frame memory is needed in total for the transmission side and the reception side, which presents a problem in that the size of the required hardware becomes large.

OBJECTS AND SUMMARY OF THE INVENTION

An object of the invention is, therefore, to provide a decoding apparatus for digital picture data which provides the high picture quality expected by three-dimensional processing and the simplified hardware achieved by two-dimensional processing.

According to an aspect of the invention, there is provided a decoding apparatus for decoding data transmitted by a coding apparatus for coding digital is provided, in combination, a coding apparatus for coding digital video data in a block format allowing compression of the video data representing a two dimensional group of picture elements belonging to a plurality of frames, the coding apparatus comprising:

sub-sampling means for sub-sampling picture elements in predetermined positions in each of a succession of frames, the phase being inverted between two continuous frames, to reduce the number of picture elements in each the of frames, thereby producing lines of thinned-out data with n picture element data in each line;

block segmentation means for arranging the picture elements of the thinned out data in time-sequential blocks, the block segmentation means including a two-line memory means and means for alternately writing n picture element data from each one of continuous pairs of lines of the thinned out data into the two-line memory means in a memory address pattern such that two successive picture element data are written in two contiguous memory addresses which are then followed by two contiguous memory addresses into which are written two successive picture element data from the next succeeding line of thinned out data, and reading out the data from the two-line memory means as block segmented data;

movement discriminating means for receiving the block segmented data and detecting movement in each block and generating a discriminating code indicative of detected movement; and encoding and transmitting means for encoding the block segmented data and transmitting the discriminating code and the encoded block segmented data; and further including a decoding apparatus comprising:

decoding means for receiving the encoded block segmented data and the discriminating code and decoding the encoded data to generate decoded block segmented data;

block desegmentation means connected to the decoding means for converting the decoded block segmented data into scanning picture element data;

adaptive interpolation means connected to the block desegmentation means and supplied with the scanning picture element data, for performing spatial interpolation of the scanning picture element data, in accordance with the discriminating code, to reconstitute the original digital video data.

In a preferred embodiment of the invention, the adaptive interpolation means interpolates the scanning picture element data by using peripheral data contained in an identical frame in the case where the discriminating code indicates a moving block, and by using the picture element data which is adjacent in the time direction and spatially corresponding in the case where the discriminating code indicates a still block. The encoding and transmitting means may include an ADRC (encoding adaptive to a dynamic range) encoder or a DCT (discrete cosine transform) encoder.

The above, and other, objects, features and advantages of the present invention will become readily apparent from the following detailed description thereof which is to be read in connection with the accompanying drawings.

DETAILED DESCRIPTION OF THE PREFERRED EMBODIMENTS

Figure 1:
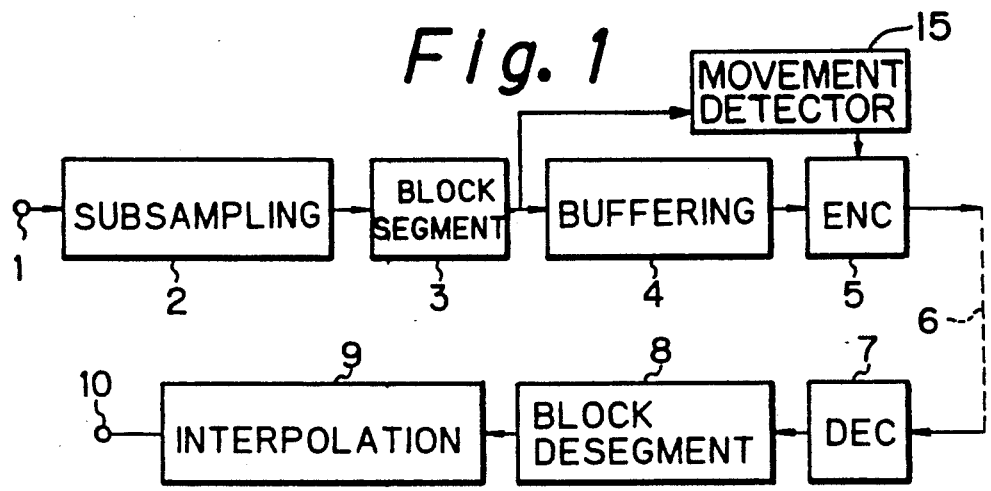
FIG. 1 is a block diagram showing the structure of one embodiment of the invention.

One embodiment of the invention will be described hereunder referring to the drawings. FIG. 1 one embodiment of the present invention. Digital video data is supplied from an input terminal indicated at 1 to a subsampling circuit 2. At the subsampling circuit 2, original picture element data is subsampled with a sampling frequency equal to one half of the original frequency. A pre-filter for preventing aliasing is provided in the subsampling circuit 2.

Figure 2:
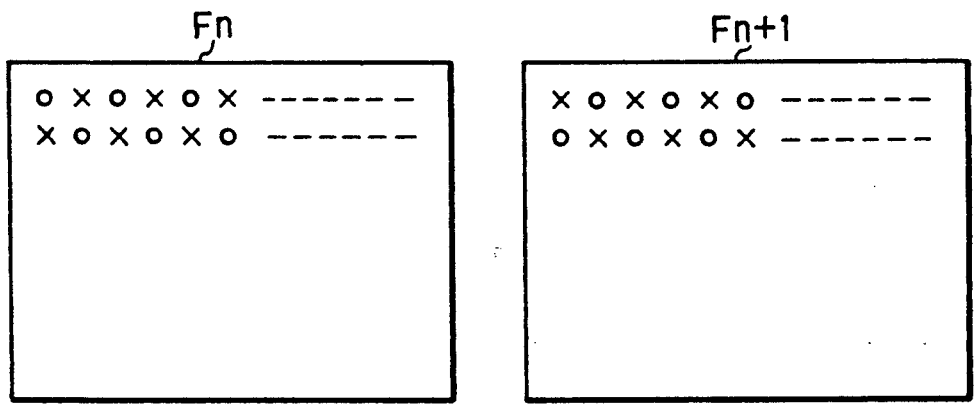
FIG. 2 is a schematic diagram showing a pattern of subsampling.

FIG. 2 shows an example of a subsampling pattern. In FIG. 2, indicates transmission picture elements of the original picture element data, while × indicates its non-transmission picture elements. In each frame, the subsampling is done by a pattern of quincunx. Also, the phase is inverted between two sequential (in time) frames Fn and Fn+1. As a result, the subsampling pattern for the two frames is complementary between frames, and in the block of a still picture, non-transmission picture elements can be interpolated by picture element data at positions corresponding to the previous frame to prevent the deterioration of definition.

The output signal of the subsampling circuit 2 is supplied to a block segmentation circuit 3. The output signal of the subsampling circuit 2 is converted into a two-dimensional block structure. In this embodiment, blocks of (2×2) are formed using two-line memory.

Figure 3:
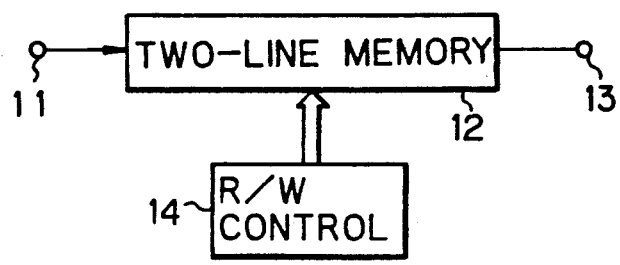
FIG. 3 is a block diagram of one example of a block segmentation circuit.

FIG. 3 shows a structure of the block segmentation circuit 3. Data subjected to the subsampling is written into a two-line memory 12 from an input terminal indicated at 11. Data in the form of blocks is taken at an output terminal 13 from the two-line memory 12. The read-out and the write-in for the two-line memory 12 are controlled by an R/W control circuit 14.

Figure 4:
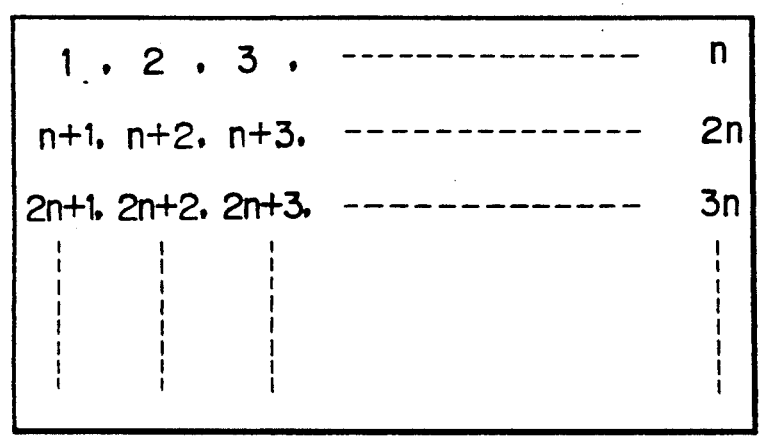
FIGS. 4, 5 a 6A–6(C) are diagrams for describing an operation of the block segmentation circuit.
Figures 5, 6A, 6B, 6C:
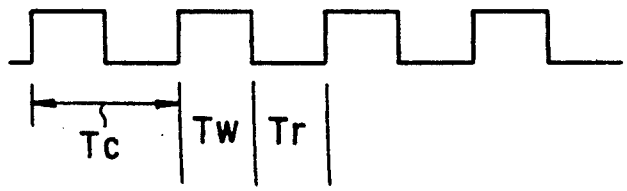

The operation of the block segmentation circuit 3 will be described referring to FIGS. 4 to 6. In this explanation numbers are attached to picture element data in a post-subsampling frame as shown in FIG. 4. Picture element data attached to each number 1 to n is contained in a line. Also, as shown in FIG. 5, the first half period of one block period Tc is a write-in period Tw, and the latter half period thereof is a read-out period Tr. The R/W control circuit 14 performs the control so that the two-line memory 12 carries out the write-in operation and the read-out operation alternately.

FIGS. 6A to 6C show a change of the contents of the two-line memory 12, and FIG. 6A shows a state where picture element data in the first line has been written. As seen from FIG. 6A, n picture element data in the first line (1, 2, 3, ..., n/2, ..., n) is written into the two-line memory 12 in two adjacent picture element data, skipping addresses of two picture element data. Upon completion of the write-in of picture element data in the one line, written data is read out with a cycle shown in FIG. 5, and picture element data (n+1, n+2, ..., 3n/2 ..., 2n) of the second line is written into addresses where the picture element data of the first line is not written.

Since the write-in of the picture element data of the second line and the read-out of the two-line memory 12 are performed alternately, picture element data of the first line and the second line of (1, 2, n+1, n+2, 3 4, n+3, n+4, ..., n−1, n, 2n−1, 2n) converted into blocks is generated at the output terminal 13. Here, a similar conversion is performed and the data converted into blocks is generated from block segmentation circuit 3.

Figure 7:
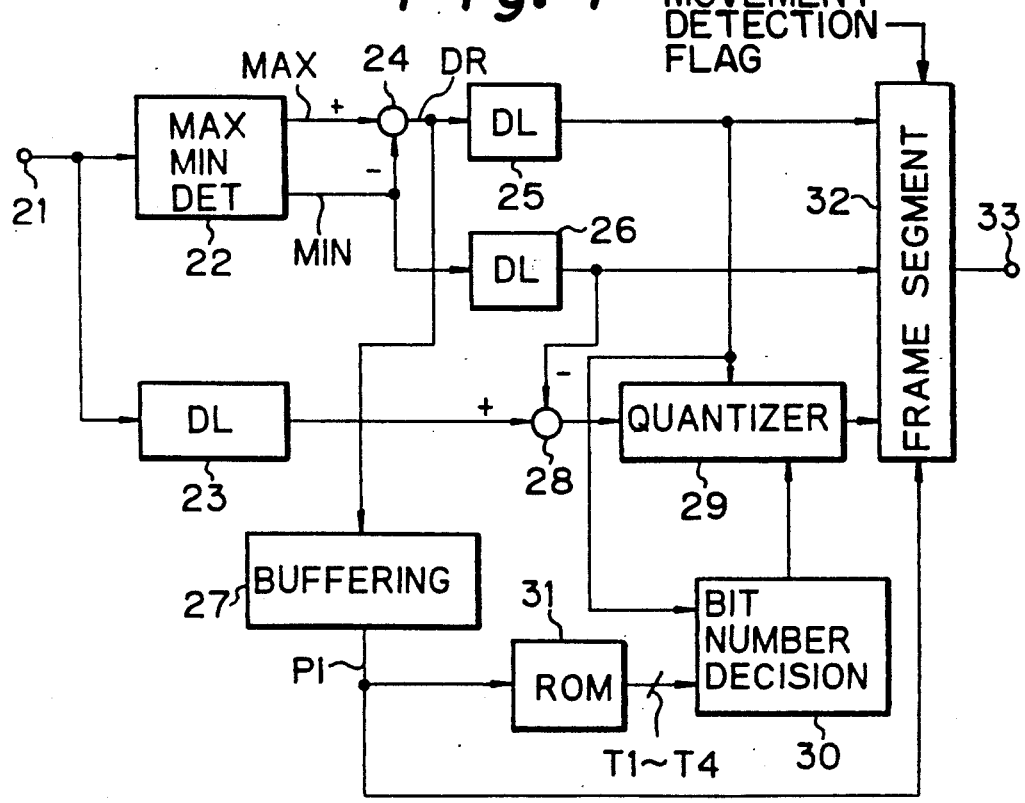
FIG. 7 is a block diagram of one embodiment of an encoder.

The output signal of the block segmentation circuit 3 is supplied to a movement detector 15 and a one-bit movement detection flag indicative of a moving picture or a still picture is formed for every block. The flag is transmitted to the reception side. Picture element data from the block segmentation circuit 3 is supplied to a buffering circuit 4. An encoder 5 is provided in association with the buffering circuit 4. The encoder 5 is a variable length ADRC (encoding adaptive to a dynamic range) encoder. The buffering circuit 4 and the encoder 5 have a structure as, for example, shown in FIG. 7. In FIG. 7, data is supplied to an input terminal indicated at 21 from the block segmentation circuit 3. The output signal of the block segmentation 3 is supplied to a maximum and minimum value detector 22 and a delay circuit 23. The detector 22 detects the maximum value MAX and the minimum value MIN of each block. The delay circuit 23 delays data for the time necessary for detecting the maximum value MAX and the minimum value MIN, and for determining a threshold value so that the generated data amount does not exceed an object value. In this example, since the threshold value is set so that the data amount generated in two lines does not exceed the object value, the delay time of the delay circuit 23 is selected to be slightly longer than two lines. However, because a horizontal blanking period where valid data is not present exists in one line period, it is possible to determine the threshold value in the blanking period.

A calculation of (MAX−MIN) is done at a calculating circuit 24, and a dynamic range DR is provided from the calculating circuit 24. The dynamic range DR is supplied to delay circuits 25 and 26 and a buffering circuit 27, respectively. Picture element data given through the delay circuit 23 is also supplied to a subtracter 28. At the subtracter 28, the minimum value MIN is subtracted from the picture element data, and data with the minimum value MIN eliminated is thus generated by the subtracter 28.

The minimum-value-eliminated picture element data is fed to a quantization circuit 29. The dynamic range DR given through the delay circuit 25 and data indicative of the bit number from a bit-number decision circuit 30 are supplied to the quantization circuit 29. The bit-number decision circuit 30 determines the bit number of quantization of a corresponding block depending on the dynamic range DR and threshold values T1 to T4 from an ROM 31. The ROM 31 generates the sets of the threshold values corresponding to threshold value codes Pi generated in the buffering circuit 27.

Assuming that the quantization bit number is b, ADRC obtains a quantization step width $\Delta$ by dividing the dynamic range DR into $(2^b)$, divides each picture element data with the minimum value eliminated by the quantization step width $\Delta$ and provides a code signal by obtaining an integer from the quotient. In the case of the variable length ADRC, the quantization bit number b can be change depending on dynamic range DR. Assuming that threshold values for determining the bit number are T1, T2, T3 and T4 (where T1<T2<T3<T4), in a block in which (DR<T1), (b=0) (that is, non-transmission of a code signal) is established. In a block in which (T1≦DR<T2), (b=1) is established, in the block of (T2≦DR<T3), (b=2) is established, and in a block in which (T3≦DR<T4), (b=3) is established, in a block in which (DR≧T4), (b=4) is established.

In such a variable length ADRC, the generated information amount can be controlled by varying the threshold values T1 to T4. Since there are an infinite number a specific set of, of sets of threshold values, for example, 32 threshold values, which can be identified by parameter code Pi (P0, P1, P2, . . . , P31), is prepared. The threshold values are set so that the generated information amount decreases or increases evenly for every change of the parameter code Pi.

In the buffering circuit 27, the frequencies of the dynamic range DR of the blocks in the two-line period are collected. The frequencies from the maximum dynamic range to the minimum dynamic range are converted into a cumulative type frequency distribution table. The frequency distribution table is formed by supplying the dynamic range DR as an address of RAM and writing +1 into the predetermined address. With this frequency distribution table, the frequency is read out sequentially from an address at which the dynamic range is larger, accumulated with the value read out of the previous address and written into the same address so as to form the cumulative type frequency distribution table. By applying the sets of the threshold values to the cumulative type frequency distribution table, the calculation of the generated information amount can be made. The generated information amount thus calculated and the object value are compared, and the sets of the threshold values are determined so that the data amount does not exceed the object value and the degradation of picture quality can be suppressed. The parameter code Pi from the buffering circuit 27 indicates the optimum set of the threshold values.

The buffering of such variable length ADRC is described in detail in the specification of Japanese Patent Laid Open Publication No. Sho 63-111781 already proposed by the present Applicant. This embodiment is different from the previous Application in that the calculation of the generated information amount and the control are done in a two-line period rather than a frame period.

The dynamic range DR and the minimum value MIN from the delay circuits 25 and 26 and the code signal from the quantization circuit 29 and the parameter code Pi indicative of the set of the threshold values are given to a frame segmentation circuit 32, and transmission data is taken out at an output terminal 33. The frame segmentation circuit 32 forms transmission data in which the dynamic range DR, the minimum value MIN, the code signal and the parameter code Pi are arranged in byte serial form and a synchronization signal is added. In addition, in the frame segmentation circuit 32, the encoding of an error correction code for each of the additional codes (DR, MIN, Pi) and the code signal is performed. Also, the movement detection flag for every block is supplied to the frame segmentation circuit 32, and the movement detection flag is transmitted.

Transmission data taken out at the output terminal 33 of the frame segmentation circuit 32 is supplied to a reception side through a transmission path 6 indicated by a broken line. The transmission path 6 is a process of recording and reproduction composed of a magnetic tape and a rotary head, for example.

On the reception side, as shown in FIG. 1, reception data is supplied to a decoder 7. Similarly, but opposite to the above-mentioned ADRC encoder 5, the decoder 7 is equipped with a frame desegmentation circuit. The bit number of each block is detected from the parameter code Pi and the dynamic range DR separated at the frame desegmentation circuit. The value of each picture element with the minimum value eliminated in a block is decoded from the bit number, the dynamic range DR and the code signal. The minimum value MIN is added to the decoded value, and each picture element data is reproduced.

A reproduced value from a decoder 7 is fed to a block desegmentation circuit 8. Contrary to the block segmentation circuit 3, the block desegmentation circuit 8 is a circuit for converting data in the order of blocks into the scanning order. The block desegmentation circuit 8 can be made up of a two-line memory similarly to the block segmentation circuit 3.

The output signal of the block desegmentation circuit 8 is supplied to an interpolating circuit 9. In the interpolating circuit 9, spatial interpolation using reproduced data in a frame is performed referring to the movement detection flag with respect to picture element data contained in a moving block. With respect to picture elements contained in a still block, interpolation is done in the time direction using reproduced data in the previous frame. For an example of the spatial interpolation, a method where non-transmission picture elements are interpolated by an average value of reproduced data of transmission picture elements present in the vicinity of the non-transmission picture elements in a frame can be employed. The interpolation in the time direction converts reproduced data of transmission picture elements in the previous frame into the non-transmission picture elements in the present frame using the fact that the phase of the subsampling is complementary to the previous frame. For the interpolation in the time direction, a frame memory is needed. Reproduced picture data is provided at an output terminal 10 of the interpolating circuit 9.

In the above-mentioned embodiment, since a block has a small size such as (2×2) and the buffering is performed every two lines, the necessary memory capacity may be reduced. However, the additional code in each of the blocks becomes larger and the efficiency of the compression deteriorates. In addition, it is possible to obtain a decoded picture having high quality by employing a small buffering unit such as two lines, since a relatively loose set of threshold values can be selected in the case where the information of the 2 lines is derived from a group of blocks having severe set of threshold values is required for buffering where successive blocks have a successively large, dynamic range. As a result, there is a possibility that the quality of the picture may partially deteriorate, since the allotted number of bits becomes small with respect to a block having a large dynamic range.

That is, the averaging effect of the dynamic range cannot be obtained by such a small unit of buffering and image deterioration results. Thus, a larger block, for instance, is preferable to buffering for preventing partial deterioration, though the memory capacity for delaying is increased.

Another example of the transmission equipment applicable to the reception equipment of the invention which takes the above consideration into account, will be described referring to FIG. 8.

Figure 8:
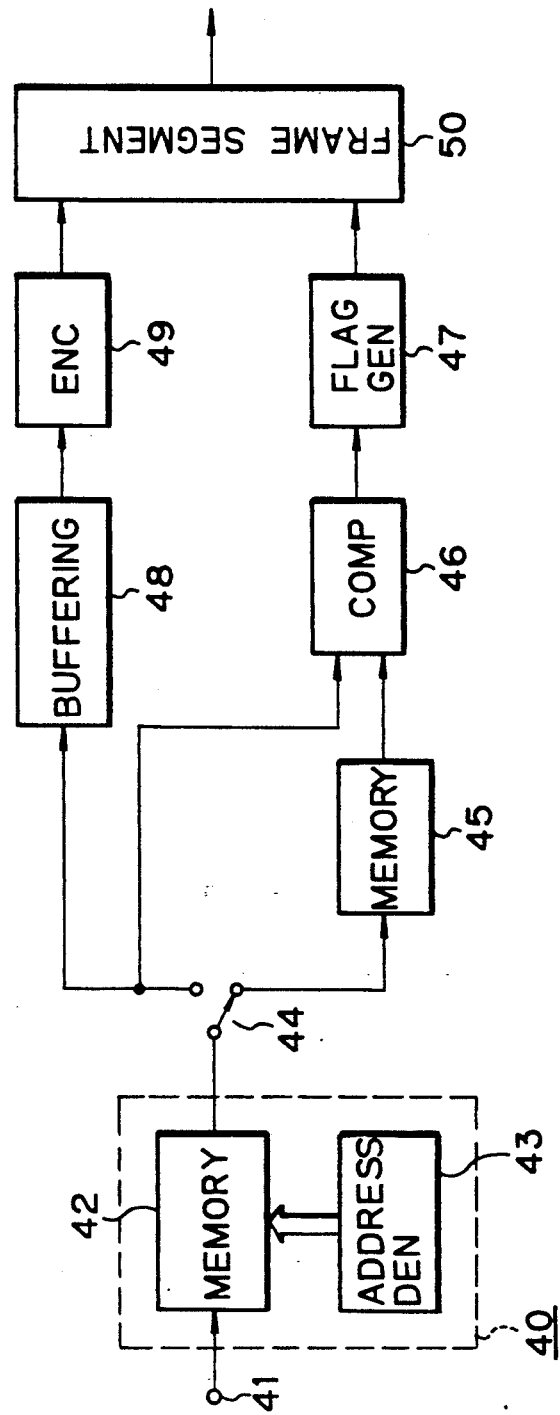
FIG. 8 is another embodiment of an encoder.

As shown in FIG. 8, the digital video signal is supplied to an input terminal 41 in the order of raster scanning, and the input signal is written into a memory 42. The memory 42 is a write-after-read type memory having the capability of a high speed operation, and the memory capacity is selected slightly larger than one field. Assuming the state to be initial, an input signal of a first field of an n-th frame is written into the memory 42 sequentially under the control of an address generator 43.

When an input signal of a second field of the same frame is input successively, a signal of an amount of two lines, for instance, is written into the part of the memory area exceeding one field (namely vacant addresses). Then the data of these two lines is read out together with the data of two lines of the first field data in the order of blocks. A block size of 8 picture elements×4 lines in which two lines belongs to each of the first field and the second field respectively is employed in this embodiment. Other block sizes can be used by changing the control of the address generator 43. The next data of two lines of the second field supplied to the memory 42 is written into the vacant addresses produced by the previous read, and the data of these two lines is read out together with the data of two lines of the first field data in the order in blocks. A similar operation in respect of the data of the second field is repeated and the block segmented data is taken out sequentially.

The timing at which the beginning of the block segmented data is read out is nearly coincident with the incoming second field data. Therefore, when the second field data has been supplied, about half of the data blocks in one frame have been read out, and the remaining data, of an amount of one field has been stored in the memory 42. Then the write-in operation of the first field data of the succeeding (n+1)-th frame to the vacant addresses is done and the read-out operation of the remaining half of the previous frame data in order of blocks is performed simultaneously with the write-in operation. Thus, when the block segmented data of all blocks in an n-th frame is read out, all of the first field data of the (n+1)-th frame has been stored in the memory 42. The data incoming in the order of raster scanning is converted to the block segmented data in order of blocks by repeating the above operation, and the block segmented data is obtained from the memory 42. The block segmentation circuit 40 is made up of the memory 42 and the address generator 43.

The output of the block segmentation circuit 40 is supplied to a switch 44 which switches every picture element. The picture element data is supplied to an encoder 49 every two picture elements through a buffering circuit 48. Thus, the subsampling of ½ is performed by the switch 44.

A pre-filter (not shown) is provided in the front stage of the switch 44 for practical use. Another output signal of the switch 44, i.e. the non-transmitted or thinned-out picture element data, which is sequentially written into a memory 45. About a half of one frame, namely the amount of one field can be applied to the storage capacity of the memory 45, since the memory 45 stores the thinned-out picture element data in the picture element data contained of one frame period.

The sampling phase of the picture element data given to the buffering circuit 48 is inverted every frame by controlling the switch 44 according to a control pulse (not shown).

Therefore, the sampling phase of the thinned out picture element data of the previous frame read out from the memory 45 coincides with that of the transmission picture element data of the present frame given to the buffering circuit 48 from the switch 44. The inphase picture element data are supplied to a comparator 46, where a level comparison is performed with the picture element data input to the buffering circuit 48. The output signal of comparator 46 is supplied to a flag generator 47. In the flag generator 47, the comparison output for every picture element is accumulated in each of the blocks, and the generator 47 decides whether the block is a moving block or a still block based on the accumulative value and derives a flag from the decision. The flag can be made up from one bit, so that, the amount of information needed for the additional code is extremely small. Other methods of the detection of motion/still can be used, although one specific type of detection has been described. For instance, the detection of a moving block can be done by using the accumulative value which is obtained by accumulating the absolute value of the comparison output for every block. In the case where the accumulative value is larger than a threshold value, the block is determined to be a moving block, while on the other hand, in the case where the accumulative value is not larger than the threshold value, the block is determined to be a still block. Another possibility is that the absolute values of the comparison output with respect to each the picture element is compared with the predetermined threshold value, the number of the comparison outputs over the threshold value is detected in the block, and the block is determined to be a moving block if the number is more than a threshold value. Thus, the motion detecting circuit is constructed by the memory 45, the comparator 46 and the flag generator 47 as a whole.

The block size of the transmission picture element data output from the switch 44 becomes 4 picture elements×4 lines=16 picture elements as a result of ½ subsampling of the switch 44. While the detail description of the buffering circuit 48 is omitted, the quantizing characteristic of the encoder 49 is controlled by the buffering circuit 48 so that the amount of transmission information does not exceed a predetermined transmission capacity. Whereas a memory capable of delaying data of one frame should be provided for the above buffering process, it is apparent that the memory capacity can be reduced to the amount of one field since the ½ subsampling is performed. The encoded data from the encoder 49 and the motion flag derived from the flag generator 47 are supplied to a frame segmentation circuit 50. The frame segmentation circuit 50 performs encoding of an error correcting code, mixing a synchronizing signal and the like, and generates an output signal having a frame structure.

The embodiment shown in FIG. 8 is able to remove the above-described drawback, since the block size is four times as large as that of the example shown in FIG. 1 and the unit of buffering is one frame, while a memory capacity of about three fields in total is necessary in the other embodiment.

The invention may also employ conversion encoding such as DCT (Discrete cosine transform), vector quantization for compression and encoding, without limitation to the ADRC.

Since this invention constitutes a two-dimensional block, performs compression and encoding for every block, and performs interpolation of non-transmission picture elements by the three-dimensional interpolating process, the memory capacity for block segmentation may be small and keeps the hardware size small. Also, good interpolation of the non-transmission picture elements may be maintained the three-dimensional processing.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. In combination, a coding apparatus for coding digital video data in a block format allowing compression of the video data representing a two dimensional group of picture elements belonging to a plurality of frames, the coding apparatus comprising:

sub-sampling means for sub-sampling picture elements in predetermined positions in each of a succession of frames, the phase being inverted between two continuous frames, to reduce the number of picture elements in each of the frames, thereby producing lines of thinned-out data with n picture element data in each line;

block segmentation means for arranging the picture elements of the thinned out data in time-sequential blocks, the block segmentation means including a two-line memory means and means for alternately writing n picture element data from each one of continuous pairs of lines of the thinned out data into the two-line memory means in a memory address pattern such that two successive picture element data are written in two contiguous memory addresses which are then followed by two contiguous memory addresses into which are written two successive picture element data from the next succeeding line of thinned out data, and reading out the data from the two-line memory means as block segmented data;

movement discriminating means for receiving the block segmented data and detecting movement in each block and generating a discriminating code indicative of detected movement; and encoding the block segmented data and transmitting the discriminating code and the encoded block segmented data; and further including a decoding apparatus comprising:

decoding means for receiving the encoded block segmented data and the discriminating code and decoding the encoded data to generate decoded block segmented data;

block desegmentation means connected to the decoding means for converting the decoded block segmented data into scanning picture element data;

adaptive interpolation means connected to the block desegmentation means and supplied with the scanning picture element data, for performing spatial interpolation of the scanning picture element data, in accordance with the discriminating code, to reconstitute the original digital video data.

2. The combination in accordance with claim 1, wherein the adaptive interpolation means interpolates the scanning picture element data by using peripheral data contained in an identical frame in the case where the discriminating code indicates a moving block, and by using the picture element data which is adjacent in the time direction and spatially corresponding in the case where the discriminating code indicates a still block.

3. The combination in accordance with claim 1, wherein the encoding and transmitting means includes an ADRC (encoding adaptive to a dynamic range) encoder.

4. The combination in accordance with claim 1, wherein the encoding and transmitting means includes a DCT (discrete cosine transform) encoder.

* * * * *